United States Patent
Wise (10) Patent No.: US 9,461,971 B1
(45) Date of Patent: Oct. 4, 2016

(54) OPTIONAL COMPRESSION OF SECURE NETWORK TRAFFIC

(71) Applicant: MTN Satellite Communications, Seattle, WA (US)

(72) Inventor: Robert M Wise, Issaquah, WA (US)

(73) Assignee: EMC SatCom Technologies LLC, Miramar, FL (US)

( * ) Notice: Subject to any disclaimer, the term of this patent is extended or adjusted under 35 U.S.C. 154(b) by 132 days.

(21) Appl. No.: 14/328,563

(22) Filed: Jul. 10, 2014

(51) Int. Cl.
G06F 9/00 (2006.01)
H04L 29/06 (2006.01)
H04W 12/00 (2009.01)

(52) U.S. Cl.
CPC .......... *H04L 63/0428* (2013.01); *H04W 12/00* (2013.01)

(58) Field of Classification Search
CPC ...... H04H 60/46; H04H 20/74; H04H 60/23; H04L 2209/60; H04L 63/0428
See application file for complete search history.

(56) References Cited

U.S. PATENT DOCUMENTS

| 6,741,841 | B1 * | 5/2004 | Mitchell | H04B 7/18508 348/E7.093 |
| 8,782,393 | B1 * | 7/2014 | Rothstein et al. | 713/151 |
| 2008/0320151 | A1 * | 12/2008 | McCanne | H03M 7/30 709/228 |
| 2011/0022948 | A1 * | 1/2011 | Brown | G06F 17/289 715/236 |
| 2013/0253965 | A1 * | 9/2013 | Joseph | G06Q 20/4016 705/5 |
| 2014/0025648 | A1 * | 1/2014 | Corbett et al. | 707/692 |

* cited by examiner

*Primary Examiner* — Mohammed Waliullah
(74) *Attorney, Agent, or Firm* — FSP LLC (57) ABSTRACT

A system includes a shore based security proxy to transmit and receive encrypted network traffic on behalf of users who opt in. The shore-based security proxy includes an Internet interface and a data compander. The system further includes a compander on a mobile vessel comprising a satellite interface and a local area network (LAN) interface, and logic to exchange uncompressed, unencrypted traffic over the LAN interface between user devices on the mobile vessel and the compander on the mobile vessel; and logic for the shore based compander to exchange compressed, encrypted data with the compander on the mobile vessel over the satellite interface.

4 Claims, 14 Drawing Sheets

OPTIONAL COMPRESSION OF SECURE NETWORK TRAFFIC

CROSS-REFERENCE TO RELATED APPLICATIONS

Not Applicable.

BACKGROUND OF THE INVENTION

When a mobile communications platform is far from land, bandwidth is a limited resource. A high percentage of traffic, especially server to client traffic, consists of textual data, such as HTML, JavaScript, CSS, email, text messages, tweets, etc. Compression technology applied reversibly at an on shore data center and within the infrastructure of a mobile vessel could conserve bandwidth and therefore enable higher levels of service to users. Blocking that is the fact that it has become common practice for security concerns to encrypt web traffic. Encrypted data is effectively incompressible.

Traffic from mobile to fixed is also commonly encrypted, thereby blocking the MCP from inspecting the traffic to ascertain its urgency and potential for being prioritized or de-prioritized for QoS levels such as immediate delivery vs store and forward.

BRIEF SUMMARY OF THE INVENTION

Not Applicable.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1 is a diagram of an embodiment of a system for user opt in.

FIG. 2 is an action flow diagram of an embodiment of a process for user opt in.

FIG. 3 is a flow chart of an embodiment of a process for user opt in.

DETAILED DESCRIPTION OF THE INVENTION

Glossary

"Database" in this context refers to an organized collection of data (states of matter representing values, symbols, or control signals to device logic), structured typically into tables that comprise 'rows' and 'columns', although this structure is not implemented in every case. One column of a table is often designated a "key" for purposes of creating indexes to rapidly search the database.

"decryption" in this context refers to the inverse of encryption/encoding.

"Encryption" in this context refers to conversion of data into a form that can't be easily understood by unauthorized people. This form is commonly referred to as a ciphertext, or more commonly a cipher. Upon receipt of the encrypted data, it needs to be decrypted (changed back to normal data).

"MCP" in this context refers to refers to Mobile Communications Platform, moving machines having local (on board) logic. The term MCP includes ships, land vehicles (trucks, trains, cars . . . ), and aircraft.

"mobile device" in this context refers to any device that includes logic to communicate over a machine network and having a form factor compatible with being carried conveniently by a single human operator. Mobile devices typically have wireless communications capability via WAPs or cellular networks. 'mobile' data or communications refers to signals to and from mobile devices.

"network" in this context refers to a telecommunications network that allows computers to exchange data. In computer networks, networked computing devices pass data to each other along data connections. The connections (network links) between nodes are established using either cable media or wireless media.

"Packet" in this context refers to a sequence of binary digits, including control signals and data, that is transmitted and switched as a unit.

"Proxy" in this context refers to a component that acts as a front end to another (back end) component, fulfilling requests to the back end component when possible, otherwise passing the requests to the back end component for fulfillment.

"QoS" in this context refers to (Quality of Service) refers to a wide range of connection quality measurements. Connection delay and interference may be measured, as well as sound quality and volume, and echo. In more modern digital data networks, QoS can refer to specific standards for prioritizing time-sensitive data, such as real-time audio and video connections, including VoIP and video calling.

"Upload" in this context refers to the communication from a mobile device (phone, PDA, laptop computer) to a network or server (mobile phone network, Internet etc.).

"Web service" in this context refers to logic which can be invoked to provide functionality to network devices at a network address over the Internet or a private network. A web service provides interoperable machine-to-machine interaction to make available a set of functionality over a network.

DESCRIPTION

Figure 1:
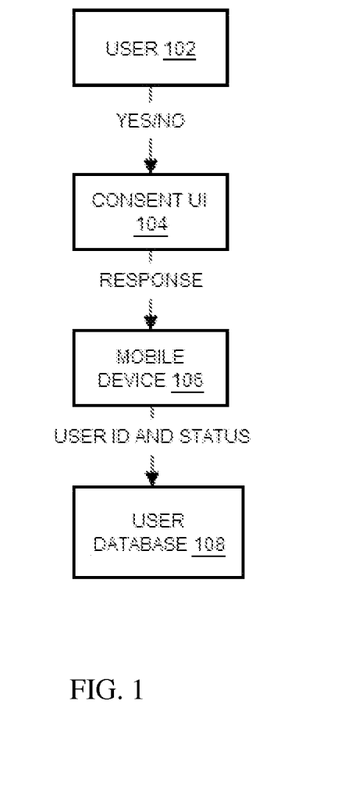

FIG. 1 is an embodiment of a process by which a user opts in to participating in an embodiment of the system. The status of each user of the network is stored in a database. All users by default are out of the system and must explicitly opt in to participate.

Figure 4:
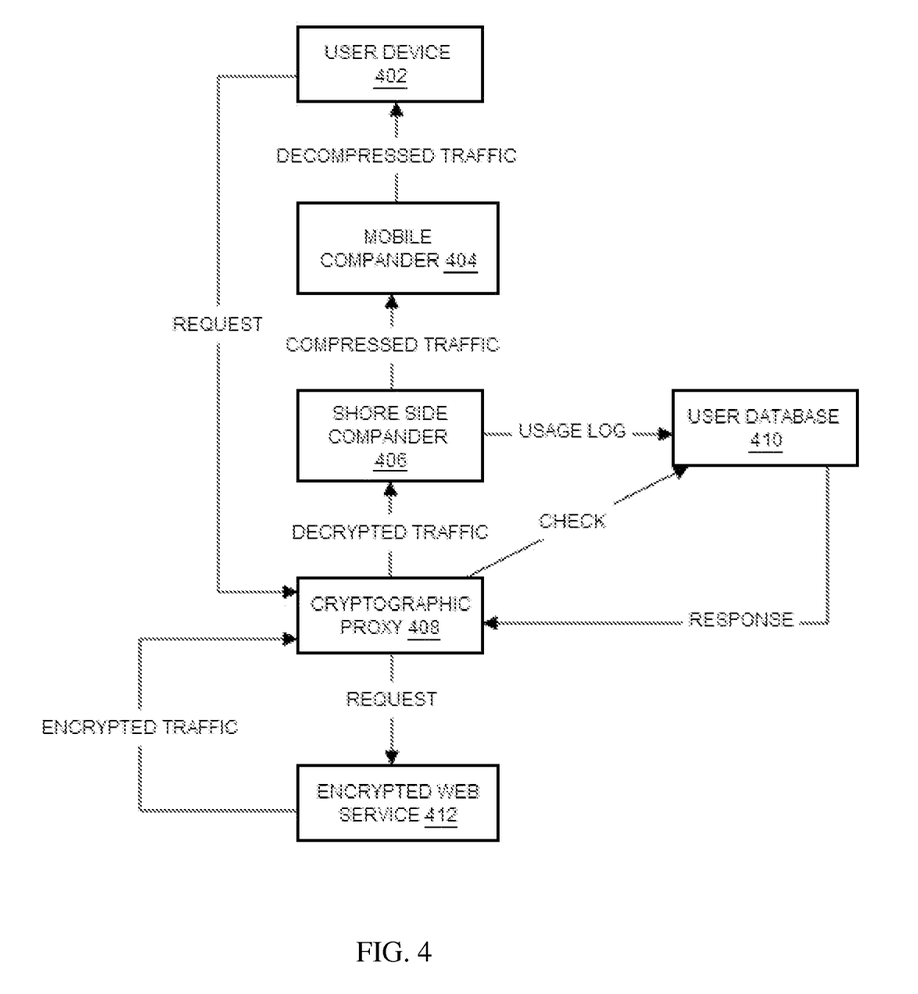
FIG. 4 is a system diagram of an embodiment of a system to optionally compress secure traffic.

FIG. 4 is an embodiment of a process by which the system enables the MCP to provide to those users who opt in a level of service for fixed to mobile traffic guaranteed to be different than the level of service of those users who do not opt in. A user device makes a request. The request is intercepted by the cryptographic proxy. If the user has not opted in, the system passes data unchanged. If a user has opted in, the cryptographic proxy forwards the request to an encrypted web service as if the proxy were the end user. The proxy receives the encrypted traffic in response. For a user who has opted in, the cryptographic proxy decrypts the the encrypted traffic and forwards it to the fixed compander. Given any decrypted traffic, the fixed compander compresses same and delivers it to the mobile compander and sends a record of bytes saved to the user database. Encrypted traffic is passed through unchanged. Given any received compressed traffic, the mobile compander, decompresses it and delivers it to the user device. Encrypted traffic is passed through unchanged.

Figure 7:
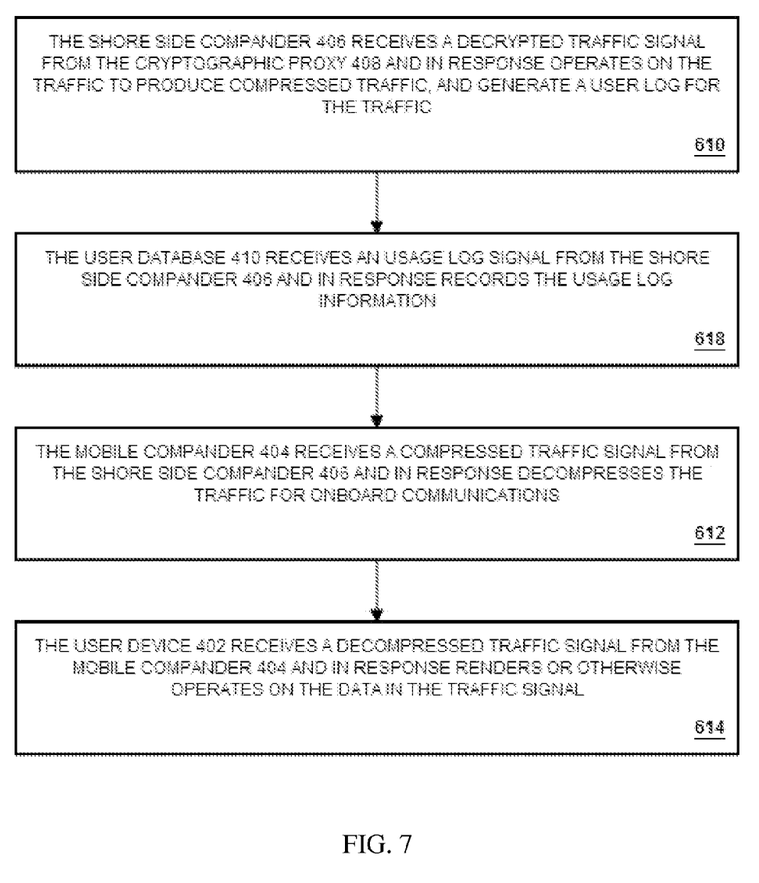
FIG. 7 is a flow chart of an embodiment of a system to optionally compress secure traffic process.

FIG. 7 is an embodiment of a process which an embodiment of the system enables the MCP to provide to those users who opt in a level of service for mobile to fixed traffic guaranteed to be different than the level of service of those users who do not opt in. A user device makes a post (to upload data to fixed web service). The post is intercepted by the user proxy, mobile end. If the user has not opted in, the system passes data unchanged. If a user has opted in, the user proxy, mobile end replies immediately with an ack, so the user may proceed to other tasks and forwards the post either to a high QoS queue or a low QoS queue (depending on packet inspection and set rules) and sends a usage log to the user database. (Alternative embodiments may comprise any number of queues of differentiated QoS.) The low QoS may deliver the packets more slowly than the high queue or hold them until a set time window of lower load on the network. In a different embodiment the low queue selectively alters data by reducing resolution or quality of media. If the user has not opted in, the system passes data unchanged via the high QoS queue. All queues deliver data to the fixed end of the user proxy, fixed end, where the data are posted on behalf of the user to a web service, which replies with an ack.

Drawings

Figure 2:
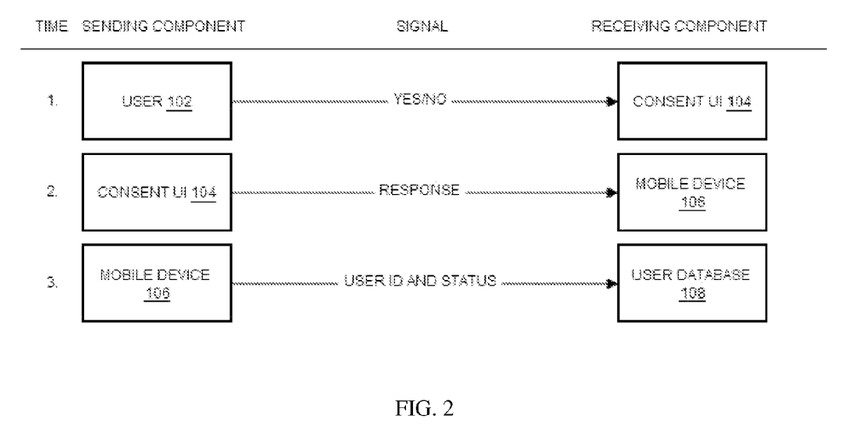
Figure 3:
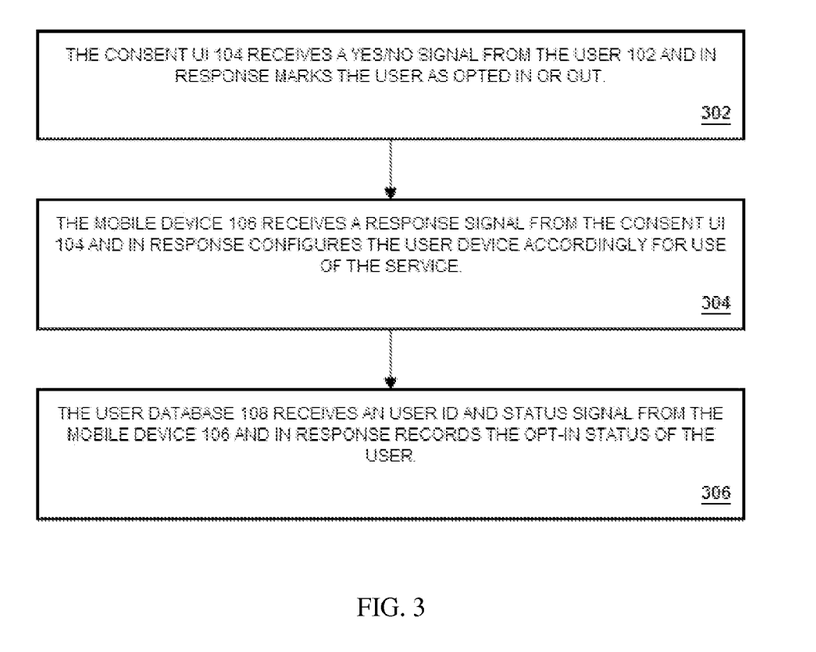

FIG. 1 is a diagram of an embodiment of a system for user opt in. FIG. 2 is an action flow diagram of an embodiment of a process for user opt in. FIG. 3 is a flow chart of an embodiment of a process for user opt in. The system comprises user 102, consent UI 104, mobile device 106, and user database 108. The consent UI 104 receives a yes/no signal from the user 102 and in response marks the user as opted in or out (302). The mobile device 106 receives a response signal from the consent UI 104 and in response configures the user device accordingly for use of the service (304). The user database 108 receives an user id and status signal from the mobile device 106 and in response records the opt-in status of the user (306).

Figure 5:
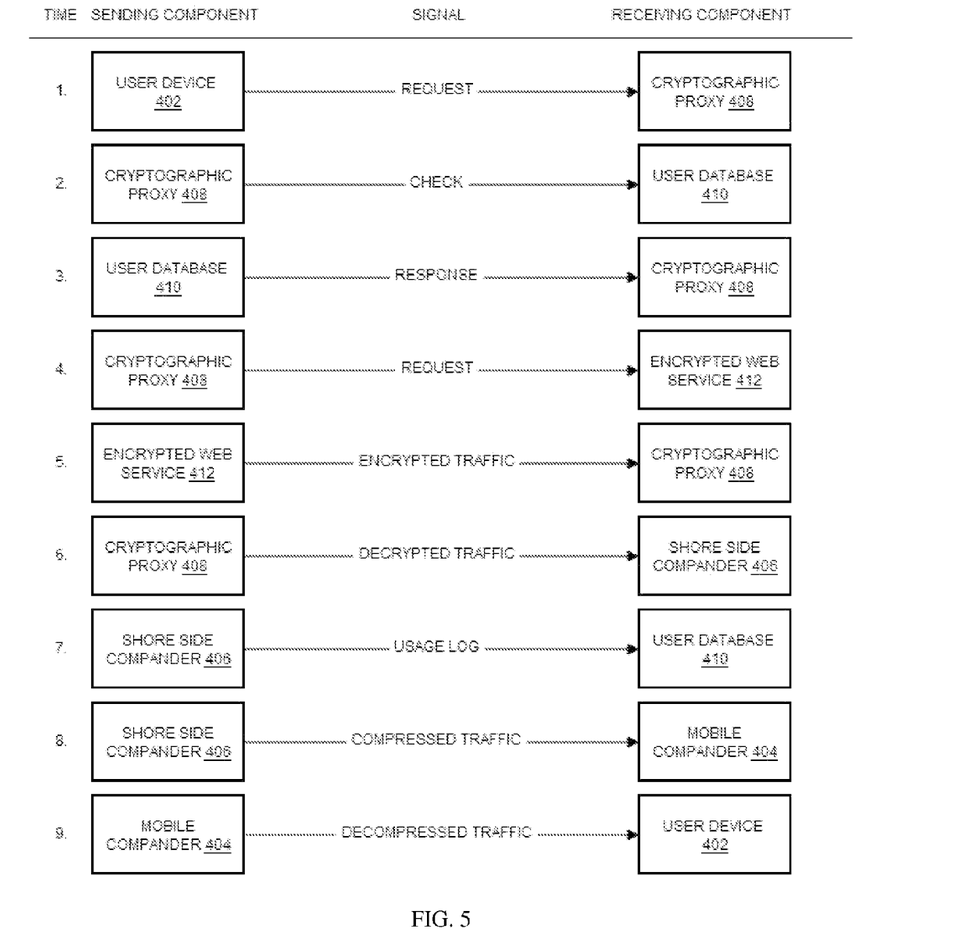
FIG. 5 is an action flow diagram of an embodiment of a system to optionally compress secure traffic process.
Figure 6:
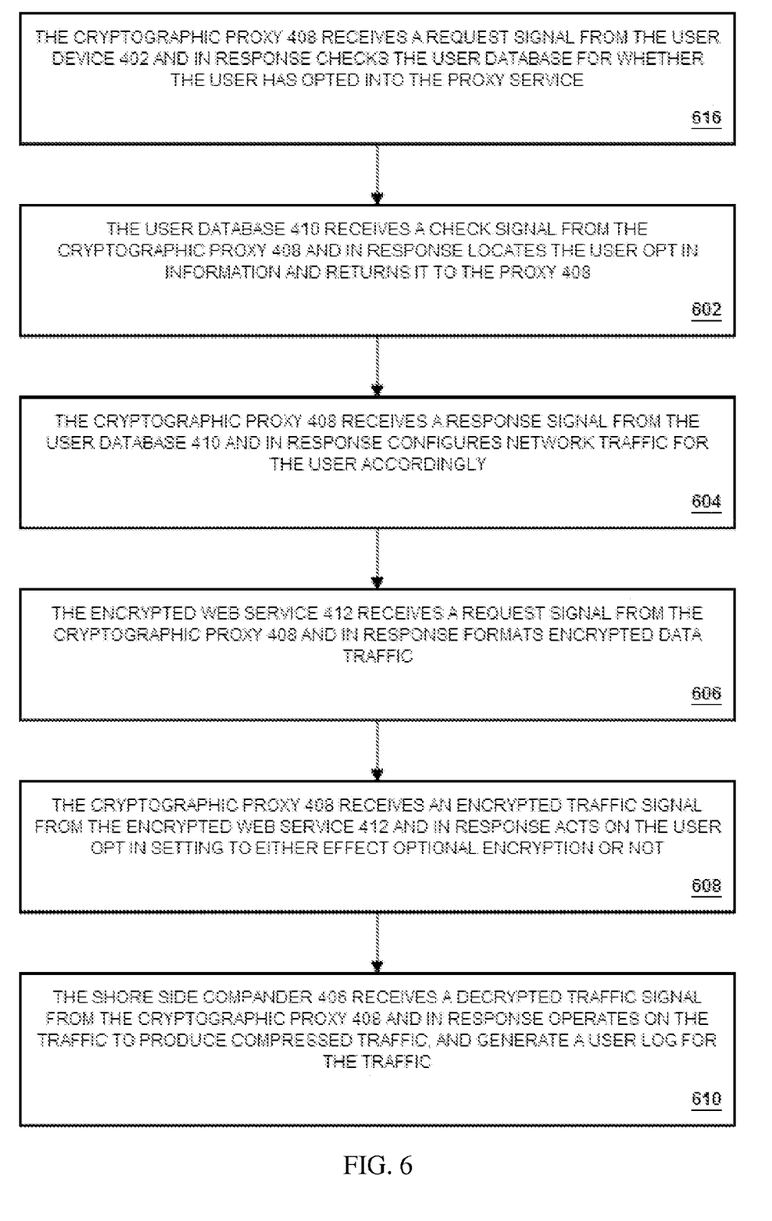
FIG. 6 is a flow chart of an embodiment of a system to optionally compress secure traffic process.

FIG. 4 is a system diagram of an embodiment of a system to optionally compress secure traffic. FIG. 5 is an action flow diagram of an embodiment of a system to optionally compress secure traffic process. FIG. 6-7 is a flow chart of an embodiment of a system to optionally compress secure traffic process.

The system comprises user device 402, mobile compander 404, shore side compander 406, cryptographic proxy 408, user database 410, and encrypted web service 412. The cryptographic proxy 408 receives a request signal from the user device 402 and in response checks the user database for whether the user has opted into the proxy service (616). The user database 410 receives a check signal from the cryptographic proxy 408 and in response locates the user opt in information and returns it to the proxy 408 (602). The cryptographic proxy 408 receives a response signal from the user database 410 and in response configures network traffic for the user accordingly (604). The encrypted web service 412 receives a request signal from the cryptographic proxy 408 and in response formats encrypted data traffic (606). The cryptographic proxy 408 receives an encrypted traffic signal from the encrypted web service 412 and in response acts on the user opt in setting to either effect optional encryption or not (608). The shore side compander 406 receives a decrypted traffic signal from the cryptographic proxy 408 and in response operates on the traffic to produce compressed traffic, and generate a user log for the traffic (610). The user database 410 receives an usage log signal from the shore side compander 406 and in response records the usage log information (618). The mobile compander 404 receives a compressed traffic signal from the shore side compander 406 and in response decompresses the traffic for onboard communications (612). The user device 402 receives a decompressed traffic signal from the mobile compander 404 and in response renders or otherwise operates on the data in the traffic signal (614).

Figure 8:
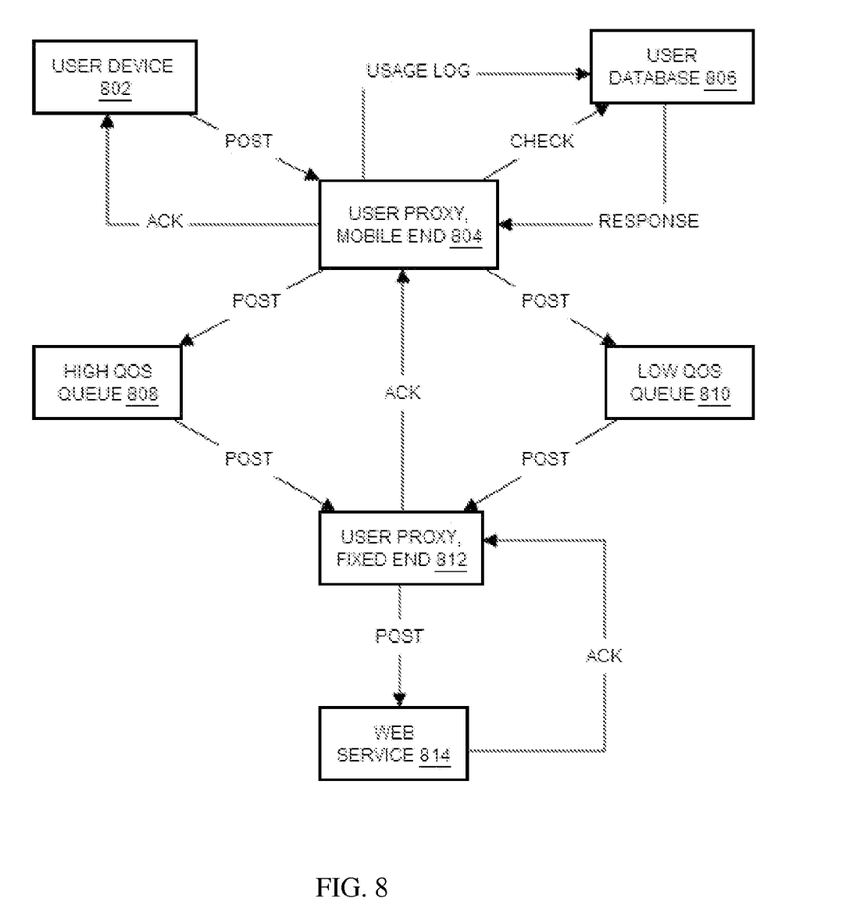
FIG. 8 is a system diagram of an embodiment of an user proxy.
Figure 9:
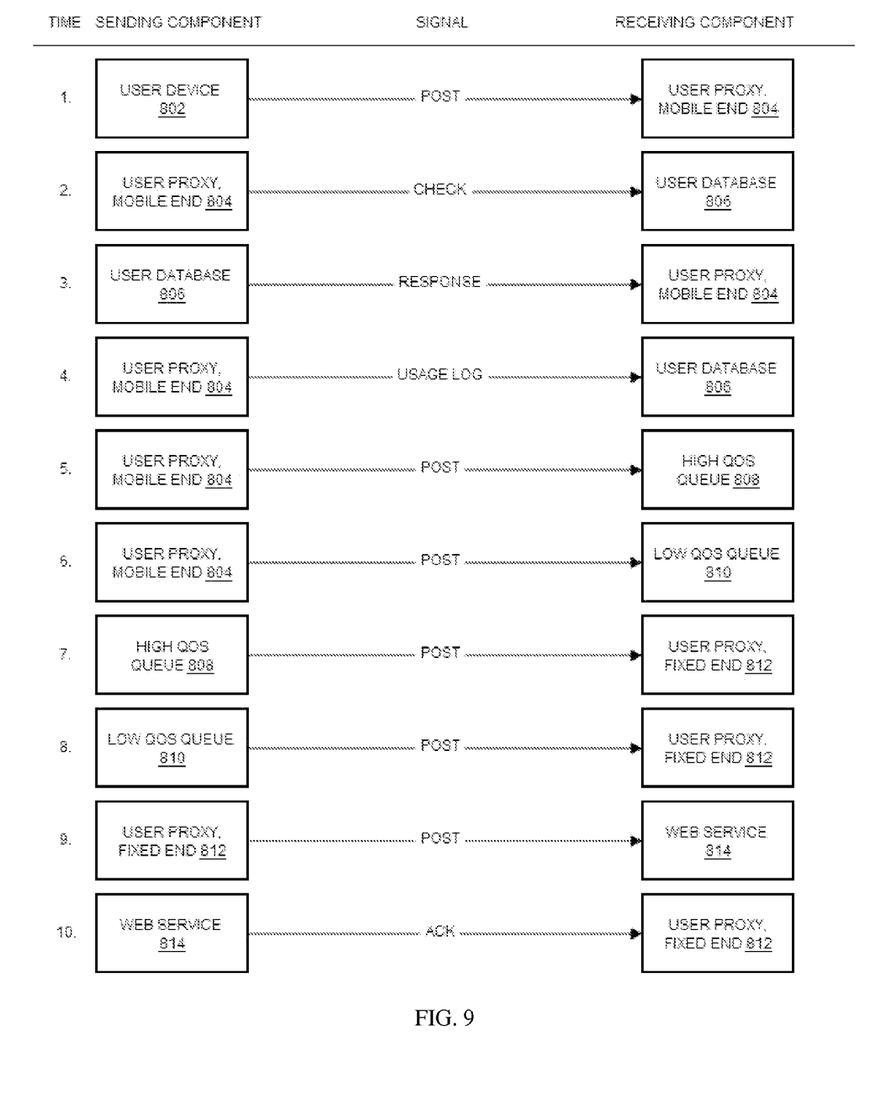
FIG. 9 is an action flow diagram of an embodiment of an user proxy process.
Figure 10:
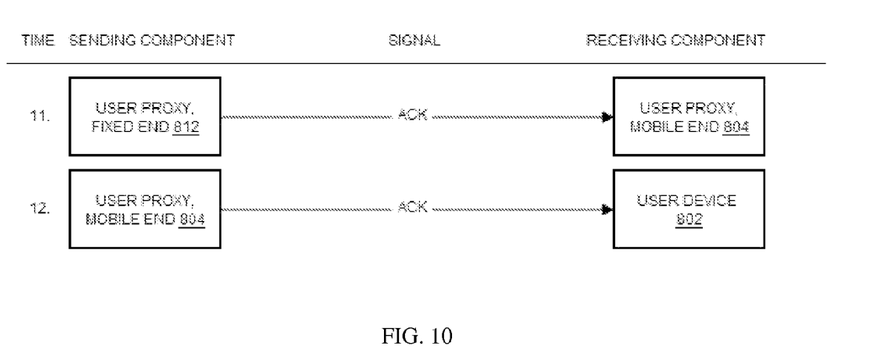
FIG. 10 is an action flow diagram of an embodiment of an user proxy process.
Figure 11:
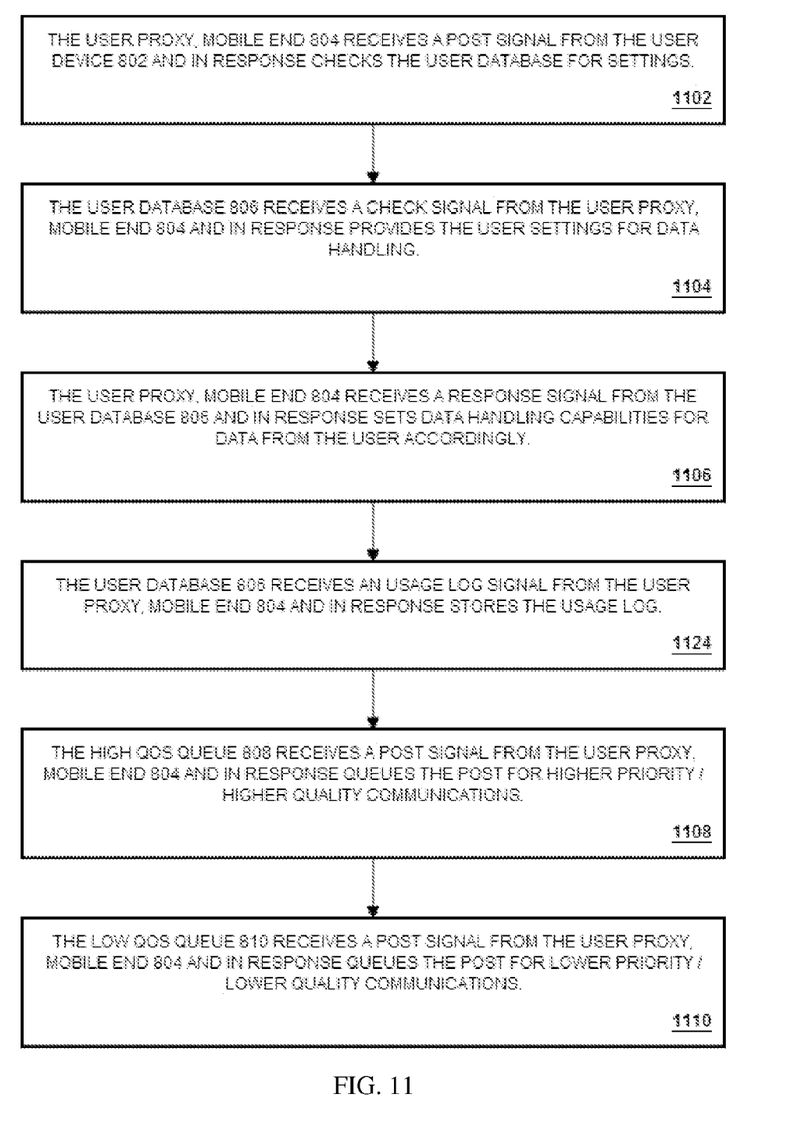
FIG. 11 is a flow chart of an embodiment of an user proxy process.
Figure 12:
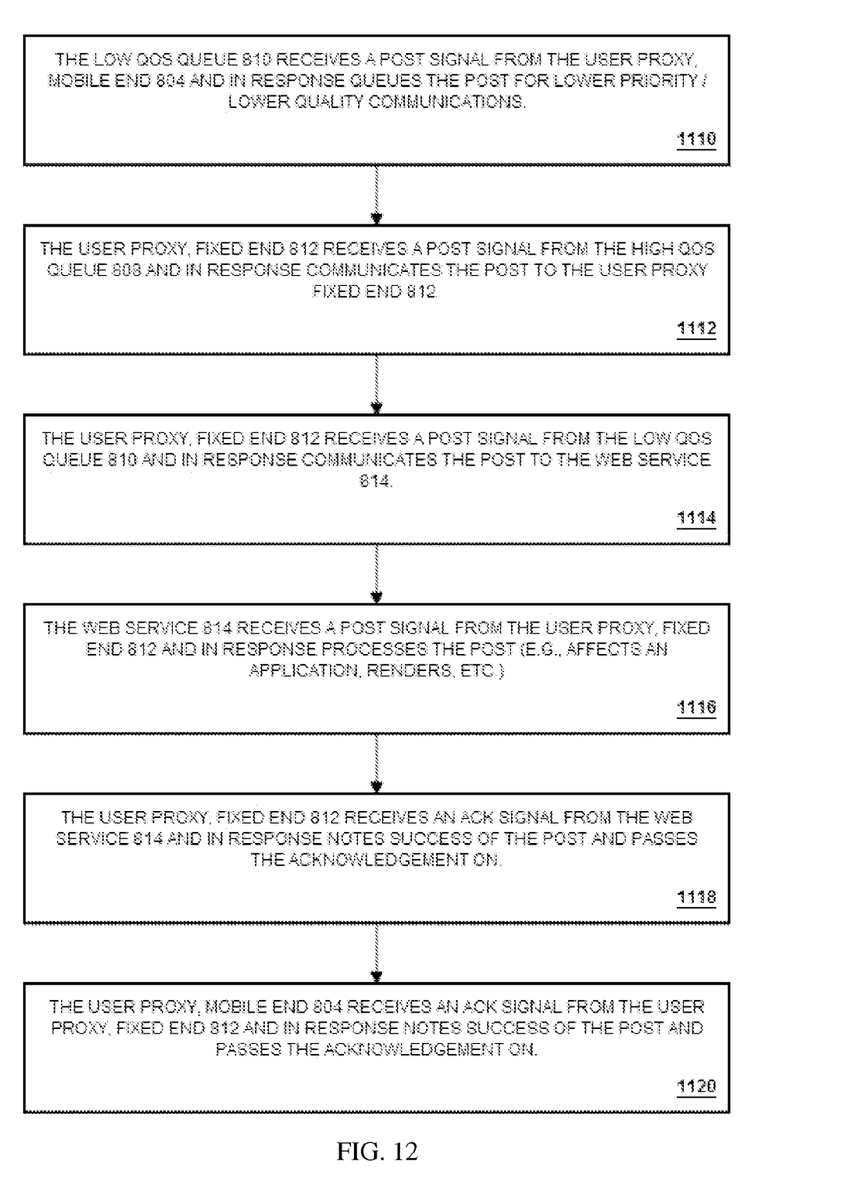
FIG. 12 is a flow chart of an embodiment of an user proxy process.
Figure 13:
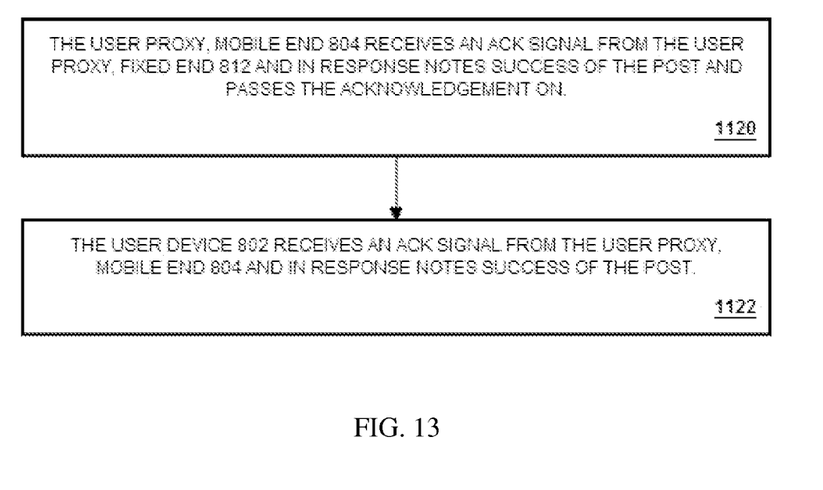
FIG. 13 is a flow chart of an embodiment of an user proxy process.

FIG. 8 is a system diagram of an embodiment of an user proxy. FIG. 9-10 is an action flow diagram of an embodiment of an user proxy process. FIG. 11-13 is a flow chart of an embodiment of an user proxy process. The system comprises user device 802, user proxy, mobile end 804, user database 806, high QOS queue 808, low qos queue 810, user proxy, fixed end 812, and web service 814.

The user proxy, mobile end 804 receives a post signal from the user device 802 and in response checks the user database for settings (1102). The user database 806 receives a check signal from the user proxy, mobile end 804 and in response provides the user settings for data handling (1104). The user proxy, mobile end 804 receives a response signal from the user database 806 and in response sets data handling capabilities for data from the user accordingly (1106). The user database 806 receives an usage log signal from the user proxy, mobile end 804 and in response stores the usage log (1124). The high QOS queue 808 receives a post signal from the user proxy, mobile end 804 and in response queues the post for higher priority/higher quality communications (1108). The low qos queue 810 receives a post signal from the user proxy, mobile end 804 and in response queues the post for lower priority/lower quality communications (1110). The user proxy, fixed end 812 receives a post signal from the high QOS queue 808 and in response communicates the post to the user proxy fixed end 812 (1112). The user proxy, fixed end 812 receives a post signal from the low qos queue 810 and in response communicates the post to the web service 814 (1114). The web service 814 receives a post signal from the user proxy, fixed end 812 and in response processes the post (e.g., affects an application, renders, etc.) (1116). The user proxy, fixed end 812 receives an ack signal from the web service 814 and in response notes success of the post and passes the acknowledgement on (1118). The user proxy, mobile end 804 receives an ack signal from the user proxy, fixed end 812 and in response notes success of the post and passes the acknowledgement on (1120). The user device 802 receives an ack signal from the user proxy, mobile end 804 and in response notes success of the post. (1122).

Figure 14:
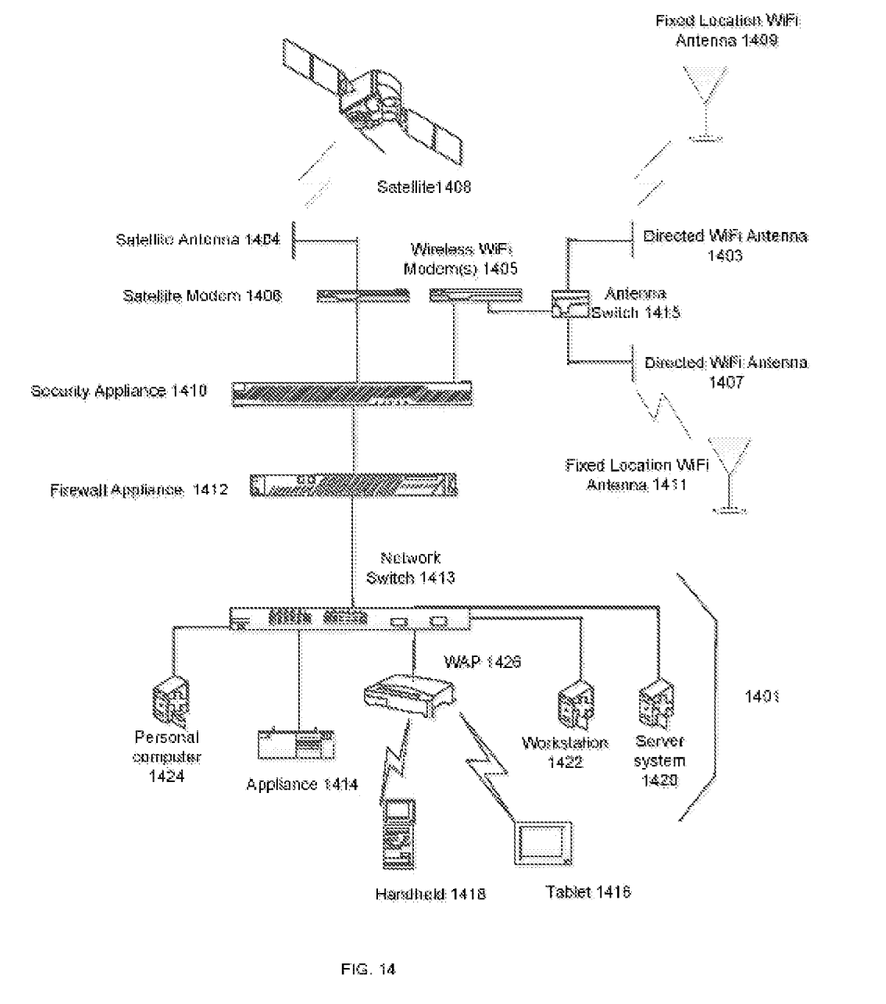
FIG. 14 is a figure describing a machine internetworking system for opt-in data compression

FIG. 14 illustrates an embodiment of a machine internetworking system that may be utilized to implement an opt-in data compression system as described herein. Communication is carried out between devices of a local area network (LAN) 1401 and a wide area network (WAN) (e.g., the Internet) via a satellite antenna 1404 and satellite 1408. The LAN 1401 includes server systems 1420, personal computers 1424, appliances 1414, tablets 1416, handheld (mobile) devices 1418, and workstations 1422. A WAP 1426 provides wireless access to the LAN 1401. Of course, a typical LAN includes other devices as well, such as printers, faxes, scanners, etc. The networks are bridged via a system of devices including (in this example) a satellite modem 1406, a security appliance 1410, a firewall appliance 1412, and a network switch 1418. The security appliance 1410 (e.g., Cisco 5510) provides, for example, firewall and VPN (virtual private network) concentration, intrusion detection, and intrusion prevention. The firewall appliance 1412 (e.g., Barracuda) provides, for example, anti-virus and anti-fishing protection for the LAN 1401, and web, email, and file content filtering. Communication traffic is switched between the LAN 1401 and the WAN by a network switch 1418. The WAN may also be accessed in some circumstances via WiFi (e.g., wireless proximity to one or more fixed location WiFi antennas 1409 and 1411). A WiFi 'modem' 1405 may provide signals to an antenna switch 1415, which in turn provides the signals to one or more directed WiFi antennas 1403, 1407. The signals are communicated to and from the antennas 1403, 1407 using WiFi to one or more fixed location WiFi antennas 1409 and 1411.

What is claimed is:

1. A system comprising:
    a fixed location encryption proxy located off a mobile vessel and coupled to communicate with a user device on the mobile vessel;
    a fixed location compander located off the mobile vessel and coupled to communicate with the fixed location encryption proxy;
    a mobile compander located on the mobile vessel;
    the fixed location encryption proxy comprising logic to intercept a request for encrypted network traffic from the user device, and only if the user device is associated with a passenger of the mobile vessel who has opted into utilizing the fixed location encryption proxy, to receive the encrypted network traffic on behalf of the user device and to decrypt the encrypted network traffic into decrypted network traffic and to communicate the decrypted network traffic to the fixed location compander;
    the fixed location compander comprising logic to compress the decrypted network traffic from the fixed location encryption proxy into compressed traffic and to communicate the compressed traffic to the mobile compander; and
    the mobile compander comprising logic to uncompress the compressed traffic from the fixed location compander into uncompressed traffic and to communicate the uncompressed traffic to the user device;
    wherein a user proxy comprising logic to inspect unencrypted traffic and assign a quality of service priority (QoS priority) to the unencrypted traffic based on content inspection of the unencrypted traffic and the user proxy selectively alters unencrypted traffic by reducing resolution or quality of media based on the assigned QoS.

2. The system of claim 1, further comprising: the user proxy comprising logic to inspect the unencrypted traffic and assign a quality of service priority (QoS priority) to the unencrypted traffic based on content inspection of the unencrypted traffic and settings for the passenger of the mobile vessel and to communicate the unencrypted traffic to the fixed location encryption proxy on behalf of the user device.

3. A method comprising:
    operating a fixed location encryption proxy located off a mobile vessel to intercept a request for encrypted network traffic from a user device located on the mobile vessel;
    only if the user device is associated with a passenger of the mobile vessel who has opted into utilizing the fixed location encryption proxy, operating the fixed location encryption proxy to receive the encrypted network traffic on behalf of the user device and to decrypt the encrypted network traffic into decrypted network traffic and to communicate the decrypted network traffic to a fixed location compander located off the mobile vessel;
    operating the fixed location compander to compress the decrypted network traffic from the fixed location encryption proxy into compressed traffic and to communicate the compressed traffic to a mobile compander located on the mobile vessel; and
    operating the mobile compander to uncompress the compressed traffic from the fixed location compander into uncompressed traffic and to communicate the uncompressed traffic to the user device;
    wherein a user proxy comprising logic to inspect unencrypted traffic and assign a quality of service priority (QoS priority) to the unencrypted traffic based on content inspection of the unencrypted traffic and the user proxy selectively alters unencrypted traffic by reducing resolution or quality of media based on the assigned QoS.

4. The method of claim 3, further comprising: the user proxy comprising logic to inspect the unencrypted traffic and assign a quality of service priority (QoS priority) to the unencrypted traffic based on content inspection of the unencrypted traffic and settings for the passenger of the mobile vessel and to communicate the unencrypted traffic to the fixed location encryption proxy on behalf of the user device.

* * * * *